(12) United States Patent
Komatsu et al.

(10) Patent No.: US 12,371,568 B2
(45) Date of Patent: Jul. 29, 2025

(54) THERMALLY CONDUCTIVE SILICONE COMPOSITION AND THERMALLY CONDUCTIVE SILICONE MATERIAL

(71) Applicant: Panasonic Intellectual Property Management Co., Ltd., Osaka (JP)

(72) Inventors: Keiichi Komatsu, Osaka (JP); Hiroshi Yamamoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 645 days.

(21) Appl. No.: 17/640,157

(22) PCT Filed: Aug. 20, 2020

(86) PCT No.: PCT/JP2020/031515
§ 371 (c)(1),
(2) Date: Mar. 3, 2022

(87) PCT Pub. No.: WO2021/044867
PCT Pub. Date: Mar. 11, 2021

(65) Prior Publication Data
US 2022/0306863 A1 Sep. 29, 2022

(30) Foreign Application Priority Data
Sep. 5, 2019 (JP) .................. 2019-162412

(51) Int. Cl.
*C08L 83/04* (2006.01)
(52) U.S. Cl.
CPC .................. *C08L 83/04* (2013.01)

(58) Field of Classification Search
CPC .................. C08K 3/22; C08L 83/04
See application file for complete search history.

(56) References Cited

U.S. PATENT DOCUMENTS

| | | | |
|---|---|---|---|
| 2019/0367792 A1* | 12/2019 | Iwata | C09K 5/14 |
| 2021/0147681 A1 | 5/2021 | Hirakawa et al. | |
| 2022/0363836 A1* | 11/2022 | Yamamoto | H01L 23/42 |
| 2023/0085242 A1* | 3/2023 | Komatsu | H05K 7/2039 |
| | | | 252/75 |

FOREIGN PATENT DOCUMENTS

| | | | | |
|---|---|---|---|---|
| JP | 11-209618 | 8/1999 | | |
| JP | 2018-50018 | 3/2018 | | |
| JP | 2019-210305 | 12/2019 | | |
| JP | 2020-73626 | 5/2020 | | |
| WO | 2018/016566 | 1/2018 | | |
| WO | 2018/056350 | 3/2018 | | |
| WO | WO-2018056350 A1 * | 3/2018 | | C01G 39/00 |
| WO | WO-2018101445 A1 * | 6/2018 | | B32B 25/02 |
| WO | WO-2020203412 A1 * | 10/2020 | | C09K 5/14 |
| WO | 2021/020540 | 2/2021 | | |

OTHER PUBLICATIONS

Official Communication issued in International Patent Application No. PCT/JP2020/031515, dated Oct. 20, 2020, along with an English translation thereof.

* cited by examiner

*Primary Examiner* — Eli D. Strah
(74) *Attorney, Agent, or Firm* — GREENBLUM & BERNSTEIN, P.L.C.

(57) ABSTRACT

A thermally conductive silicone composition contains a silicone component and a polyhedral filler.

5 Claims, 1 Drawing Sheet

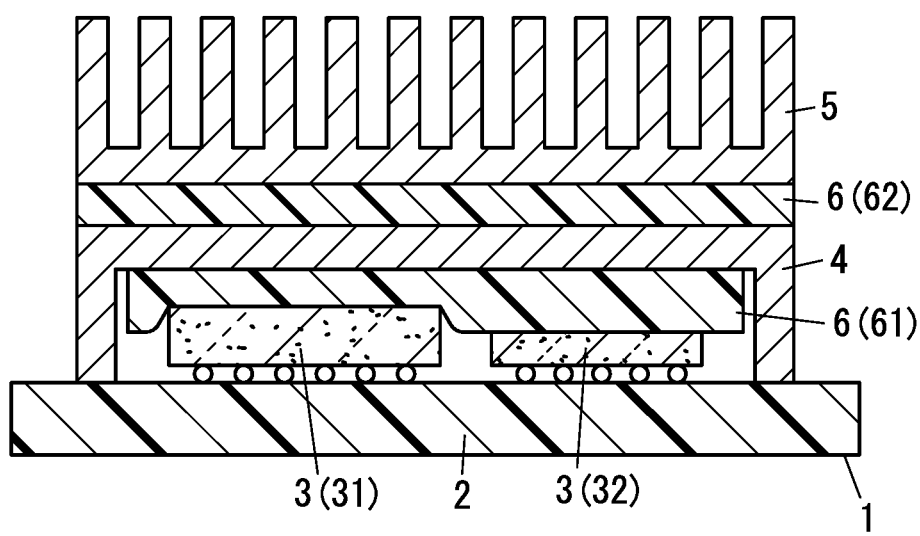

THERMALLY CONDUCTIVE SILICONE COMPOSITION AND THERMALLY CONDUCTIVE SILICONE MATERIAL

CROSS-REFERENCE TO RELATED APPLICATIONS

This application is a National Stage of International Application No. PCT/JP2020/031515 filed Aug. 20, 2020, which claims priority to Japanese Patent Application No. 2019-162412 filed Sep. 5, 2019, and the contents of each of the above-identified applications are incorporated herein by reference in their entirety.

TECHNICAL FIELD

The present disclosure relates to a thermally conductive silicone composition and a thermally conductive silicone material.

BACKGROUND ART

A thermally conductive material is disposed between an electric component, such as a transistor or a central processing unit (CPU) of a computer, and a heat radiator (heat sink) to transfer heat generated from an electronic/electric component to the heat radiator. Patent Literature 1 discloses a thermally conductive silicone rubber composition obtained by dispersing, in silicone rubber, a thermally conductive inorganic filler subjected to a surface process with a silane coupling agent.

CITATION LIST

Patent Literature

Patent Literature 1: JP H11-209618 A

SUMMARY OF INVENTION

It is an object of the present disclosure to provide: a thermally conductive silicone composition capable of increasing the thermal conductivity of a thermally conductive silicone material; and a thermally conductive silicone material made from the thermally conductive silicone composition.

A thermally conductive silicone composition according to an aspect of the present disclosure includes a silicone component and a polyhedral filler.

A thermally conductive silicone material according to an aspect of the present disclosure is produced from the thermally conductive silicone composition and includes: a silicone resin matrix made from the silicone component; and the polyhedral filler dispersed in the silicone resin matrix.

BRIEF DESCRIPTION OF DRAWINGS

FIG. 1 is a schematic sectional view of an electronic device according to an embodiment of the present disclosure.

DESCRIPTION OF EMBODIMENTS

High integration of electronic/electric components tends to more and more increase the amount of heat generated from the electronic/electric components. Moreover, mounting a plurality of electronic/electric components having different sizes on a single substrate requires efficient transferring of heat from each electronic/electric component via a thermally conductive material.

Thus, the inventors carried out research and development to obtain a thermally conductive silicone composition capable of increasing the thermal conductivity of a thermally conductive silicone material. As a result, the inventors acquired the basic idea of the present disclosure.

An embodiment of the present disclosure will be described below.

A thermally conductive silicone composition according to the present embodiment includes a silicone component and a polyhedral filler.

The present embodiment provides a thermally conductive silicone composition capable of increasing the thermal conductivity of a thermally conductive silicone material; and a thermally conductive silicone material made from the thermally conductive silicone composition. Note that in the present embodiment, the thermally conductive silicone material is a material which is produced from the thermally conductive silicone composition and which is thermally conductive. When the silicone component is a reaction curable component, curing the thermally conductive silicone composition results in production of the thermally conductive silicone material. The thermally conductive silicone material, for example, includes: a silicone resin matrix made from the silicone component; and a polyhedral filler dispersed in the silicone resin matrix. When the silicone component is a reaction curable component, the silicone resin matrix is a hardened material of the silicone component.

The silicone component is a reaction curable liquid component including, for example, an organic silicon compound. The silicone component is, for example, reaction curable silicone rubber in liquid form or silicone gel. The silicone component may be of a two-component type or a single-component type. The silicone component contains, for example, a reactive organic silicon compound, such as organopolysiloxane, and a hardener, and optionally contains a catalyst. The hardener contains, for example, at least one of organohydrogen polysiloxane or organic peroxide. The catalyst is, for example, a platinum-based catalyst. Note that the reactive organic silicon compound, the hardener, and the catalyst are not limited to the examples described above. Moreover, components which may be contained in the silicone component are not limited to the examples described above.

The polyhedral filler includes at least one of, for example, a polyhedral alumina filler or a polyhedral spinel filler. In this case, the polyhedral filler highly thermally conductive and can thus effectively reduce the thermal resistance of the thermally conductive silicone material. Note that fillers which may be contained in the polyhedral filler are not limited to the examples described above.

The polyhedral alumina filler is produced by calcining, for example, highly pure aluminum hydroxide in an atmosphere containing, for example, hydrogen chloride.

The polyhedral spinel filler may be doped with molybdenum. The polyhedral spinel filler is produced, for example, by calcining a mixture of a magnesium compound, such as metal magnesium or magnesium oxide, and an aluminum compound, such as aluminum oxide, in the presence of molybdenum to achieve crystal growth of the mixture, and then, cooling the mixture to cause its crystallization. The aluminum compound may include molybdenum, like α-alumina including molybdenum.

The polyhedral filler may be processed with a silane coupling agent. When the polyhedral filler is processed with the silane coupling agent, the polyhedral filler is easily dispersed satisfactorily in the thermally conductive silicone composition and in the thermally conductive silicone material, and thus, the thermal resistance of the thermally conductive silicone material is more likely to be reduced.

The thermally conductive silicone composition may contain a silane coupling agent. Also in this case, the polyhedral filler is easily dispersed satisfactorily in the thermally conductive silicone composition and in the thermally conductive silicone material, and thus, the thermal resistance of the thermally conductive silicone material is more likely to be reduced.

The shape of the polyhedral filler can be checked with a scanning electron microscope (SEM). If it is possible to verify that a particle in the polyhedral filler checked with the electron microscope has, for example, greater than or equal to 5 and less than or equal to 150 surfaces, it may be determined that the filler is polyhedral.

The polyhedral filler preferably has an average particle diameter of greater than or equal to 1 μm and less than or equal to 100 μm. In particular, within this range, the polyhedral filler preferably includes two or more types of particle groups having different average particle diameters. In this case, the thermally conductive silicone composition is easily satisfactorily moldable, and thus, the polyhedral filler is more likely to reduce the thermal resistance of the thermally conductive silicone material more effectively. Note that the average particle diameter of the polyhedral filler is a median diameter (D50) calculated from particle size distribution obtained by a dynamic light scattering method. The average particle diameter of the polyhedral filler is more preferably greater than or equal to 10 μm, much more preferably greater than or equal to 20 μm. Moreover, the average particle diameter of the polyhedral filler is more preferably less than or equal to 90 μm, much more preferably less than or equal to 80 μm.

The polyhedral filler preferably includes two or more types of particle groups having different average particle diameters. In this case, even when the polyhedral filler is contained in the thermally conductive silicone composition, the viscosity of the thermally conductive silicone composition is less likely to be increased. Thus, both satisfactory fluidity of the thermally conductive silicone composition and low thermal resistance of thermally conductive silicone material are easily obtained. For example, the polyhedral filler preferably contains: a first particle group having an average particle diameter of greater than or equal to 50 μm and less than or equal to 100 μm; and a second particle group having an average particle diameter of greater than or equal to 5 μm and less than or equal to 20 μm. In this case, the mass ratio of the first particle group to the second particle group is preferably within a range from 6:4 to 9:1. The polyhedral filler may further contain a third particle group having an average particle diameter of greater than or equal to 0.1 μm and less than or equal to 3 μm. In this case, the mass ratio of the first particle group to the second particle group is preferably within a range from 6:3 to 7:2, the mass ratio of the first particle group to the third particle group is preferably within a range from 6:1 to 7:1, and the mass ratio of the second particle group to the third particle group is preferably within a range from 3:1 to 2:1.

The proportion of the polyhedral filler to the total of the thermally conductive silicone composition is preferably greater than or equal to 60 volume % and less than or equal to 90 volume %. When the proportion is greater than or equal to 60 volume %, the thermal resistance of the thermally conductive silicone material is more likely to be particularly reduced. When the proportion is less than or equal to 90 volume %, the thermally conductive silicone composition is more likely to have satisfactory fluidity, and the thermally conductive silicone material is more likely to be satisfactorily flexible. The proportion is more preferably greater than or equal to 65 volume %, much more preferably greater than or equal to 70 volume %. Moreover, the proportion is more preferably less than or equal to 85 volume %, much more preferably less than or equal to 80 volume %.

The thermally conductive silicone composition is preferably in liquid form at 25° C. The viscosity of the thermally conductive silicone composition at 25° C. is preferably less than or equal to 3000 Pa·s. In this case, the thermally conductive silicone composition can be satisfactorily moldable and is easily molded into the form of a film by using, for example, a dispenser. Moreover, the thermally conductive silicone composition is easily defoamed, and therefore, voids can be suppressed from being formed in the thermally conductive silicone material. Note that the viscosity is a value measured with an E-type rotating viscometer under a condition of 0.3 rpm.

The thermally conductive silicone composition may further contain a filler other than the polyhedral filler. For example, the thermally conductive silicone composition may contain at least one type of particles selected from the group consisting of appropriate metal oxide particles other than the polyhedral filler, metal nitride particles, metal carbide particles, metal boride particles, and metal free particles.

The thermally conductive silicone composition is prepared by, for example, kneading the components described above. When the silicone component is of a two-component type, a thermally conductive silicone composition including a first agent containing a reactive organic silicon compound in the silicone component and a second agent containing a hardener in the silicone component may be prepared, and the first agent and the second agent may be mixed with each other when used. In this case, the polyhedral filler is at least contained in at least one of the first agent or the second agent.

When the thermally conductive silicone material is made from the thermally conductive silicone composition, for example, the thermally conductive silicone composition is molded into the form of a film by an appropriate method such as press molding, extrusion molding, or calendering. Molding the thermally conductive silicone composition into the form of a film with a dispenser is also preferable. Subsequently, the thermally conductive silicone composition in the form of a film is cured by being heated under a condition according to the composition thereof, thereby providing a thermally conductive silicone material in the form of a film.

Note that the forms of the thermally conductive silicone composition and the thermally conductive silicone material are not limited to the form of a film but may be any form. Moreover, when the silicone component is of a cold-curing type, the thermally conductive silicone composition may be cured without being heated, thereby providing the thermally conductive silicone material. The thermally conductive silicone material includes: a silicone resin matrix made from the silicone component; and a polyhedral filler dispersed in the silicone resin matrix.

The thermally conductive silicone material contains the polyhedral filler, so that the thermally conductive silicone material is more likely to have low thermal resistance. This is probably because particles of the polyhedral filler come into contact with each other in the thermally conductive silicone material, thereby forming a pathway via which heat is transferable, and at this time, the particles easily come into surface contact with each other, which is more likely to increase the transfer efficiency of heat between the particles.

When the thermally conductive silicone material is receiving press pressure, the thermally conductive silicone material is more likely to have particularly low thermal resistance in a direction of the press pressure. This is probably because the particles of the polyhedral filler easily come into contact with each other in the direction of the press pressure. In the present embodiment, the particles easily come into surface contact with each other as described above, and therefore, the thermal resistance is more likely to be particularly reduced by application of the press pressure, and thus, even low press pressure can reduce the thermal resistance.

The thermal resistance of the thermally conductive silicone material is reduced as described above, and therefore, in a state where thermally conductive silicone material is pressed with direct pressure under a condition of a press pressure of 1 MPa, the thermal resistance of the thermally conductive silicone material in the direction of the press pressure is preferably less than or equal to 0.8 K/W. In this case, the thermally conductive silicone material can exhibit excellent thermal conductivity and is more likely to efficiently transfer heat even with low press pressure. The thermal resistance is more preferably less than or equal to 0.7 K/W, much more preferably less than or equal to 0.6 K/W.

The Asker C hardness of the thermally conductive silicone material is preferably less than or equal to 40. The Asker C hardness is measured with, for example, Asker rubber durometer type C manufactured by KOBUNSHI KEIKI CO., LTD. When the Asker C hardness is less than or equal to 40, the thermally conductive silicone material can be satisfactorily flexible. Thus, for example, the thermally conductive silicone material is easily tightly attached to surfaces having various shapes such as a warped shape and a wavy shape. The Asker C hardness is more preferably less than or equal to 20. Moreover, the Asker C hardness is, for example, greater than or equal to 1. The low Asker C hardness is achievable by the choice of silicone components, the choice of particle sizes of the polyhedral filler, the choice of the proportion of the polyhedral filler, or the like.

Examples of an electronic device including the thermally conductive silicone material will be described. An electronic device 1 shown in FIG. 1 includes a substrate 2, a chip component 3, a heat spreader 4, a heat sink 5, and two types of thermally conductive materials 6. In the following description, one of the two types of thermally conductive materials 6 is referred to as a first thermally conductive material 61 or TIM1 61, and the other of the two types of thermally conductive materials 6 is referred to as a second thermally conductive material 62 or TIM2 62. The chip component 3 is mounted on the substrate 2. The substrate 2 is, for example, a printed wiring board. The chip component 3 is, for example, a transistor, a CPU, an MPU, a driver IC, or memory but is not limited to these examples. A plurality of chip components 3 may be mounted on the substrate 2. In this case, the chip components 3 may have different thicknesses. The heat spreader 4 is mounted on the substrate 2 to cover the chip component 3. Between the chip component 3 and the heat spreader 4, a gap is provided, and in the gap, the TIM1 61 is disposed. On the heat spreader 4, the heat sink 5 is disposed, and between the heat spreader 4 and the heat sink 5, the TIM2 62 is disposed.

The thermally conductive silicone material in the present embodiment is applicable to both of the TIM1 61 and the TIM2 62. In particular, the TIM1 61 is preferably the thermally conductive silicone material according to the present embodiment. In this case, the thermally conductive silicone material may receive press pressure from the heat spreader 4. Thus, the particles of the polyhedral filler in the thermally conductive silicone material easily comes into contact with each other as described above, and therefore, particularly low thermal resistance of the thermally conductive silicone material is more likely to be realized.

Moreover, when the electronic device 1 includes a plurality of chip components 3 and the chip components 3 have different thicknesses, the dimension of a gap between a chip component 3(32) having a smaller thickness and the heat spreader 4 is greater than the diameter of a gap between a chip component 3(31) having a larger thickness and the heat spreader 4. Therefore, the press pressure applied to the TIM1 61 between the chip component 32 having a smaller thickness and the heat spreader 4 tends to be smaller than the press pressure applied to the TIM1 61 between the chip component 31 having a larger thickness and the heat spreader 4. Thus, the press pressure applied to the TIM1 61 is more likely to differ by location. However, the thermally conductive silicone material in the present embodiment contains the polyhedral filler as described above, and therefore, the thermal resistance is more likely to be particularly reduced by application of the press pressure. Therefore, even when press pressure applied to the thermally conductive silicone material differs by location, the thermally conductive silicone material is more likely to have low thermal resistance as a whole. Thus, when the TIM1 61 is the thermally conductive silicone material according to the present embodiment, the thermally conductive silicone material can efficiently transfer heat generated from the chip component 3 to the heat spreader 4, and thereby, a high heat dissipation electronic device 1 is easily realized.

EXAMPLES

More specific examples of the present embodiment will be described below. Note that the present embodiment is not limited to the examples described below.

1. Preparation of Composition

Raw materials shown in Table 1 were mixed with each other, thereby preparing a composition. Details of the raw materials are as described below.

Item number TES8553.

Polyhedral filler: a polyhedral filler containing 80 wt. % of polyhedral spinel particles having an average particle diameter of 70 μm and doped with molybdenum, 10 wt. % of polyhedral spinel particles having an average particle diameter of 10 μm and doped with molybdenum, and 5 wt. % of polyhedral alumina particles (manufactured by Sumitomo Chemical Industry Company Limited) having an average particle diameter of 0.4 μm.

Spherical filler: a spherical filler containing 80 wt. % of spherical alumina particles (manufactured by ADEKA) having an average particle diameter of 70 μm, 10 wt. % of spherical alumina particles (manufactured by ADEKA) having an average particle diameter of 10 μm, and 5 wt. % of polyhedral alumina particles (manufactured by Sumitomo Chemical Industry Company Limited) having an average particle diameter of 0.4 μm.

Note that each polyhedral spinel particle doped with molybdenum was produced by calcining a mixture including: α-aluminum oxide including molybdenum; and magnesium oxide at 1500° C. in an air atmosphere and then cooling the mixture.

2. Evaluation (1) Viscosity

The viscosity of the composition was measured under a condition of 0.3 rpm by using, as a measurement device, an E-type viscometer (model number: RC-215) manufactured by TOM SANGYO CO., LTD.

(2) Asker C Hardness

The Asker C hardness of the composition was measured by using, as a measurement device, Asker rubber durometer type C manufactured by KOBUNSHI KEIKI CO., LTD. Moreover, as Comparative Example 4, a film having a thickness of 100 μm and made of indium was prepared, and the Asker C hardness of the film made of indium was also measured.

(3) Thermal Resistance

The composition was subjected to hot press under conditions of a heating temperature of 120° C. and a press pressure of 1 MPa for 30 minutes, thereby making a sample in the form of a sheet having a thickness of 100 μm. The sample was sandwiched between two plates made of copper, and the plates pressed the sample with direct pressure under a condition of a press pressure of 1 MPa. In this state, the thermal resistance of the sample in a direction of the press pressure was measured under a room temperature with DynTIM Tester manufactured by Mentor Graphics Corporation. Moreover, the thermal resistance of the film made of indium, which is Comparative Example 4, was also measured.

a silicone component; and a polyhedral filler, wherein the polyhedral filler containing:

a first particle group having an average particle diameter of greater than or equal to 50 μm and less than or equal to 100 μm;

a second particle group having an average particle diameter of greater than or equal to 5 μm and less than or equal to 20 μm; and a third particle group having an average particle diameter of greater than or equal to 0.1 μm and less than or equal to 3 μm, and wherein each of the first particle group and the second particle group being a polyhedral spinel filler doped with molybdenum, and the third particle being a polyhedral alumina filler.

2. The thermally conductive silicone composition of claim 1, wherein the thermally conductive silicone composition has a viscosity of less than or equal to 3000 Pa·s at 25° C.

3. A thermally conductive silicone material produced from the thermally conductive silicone composition of claim 1, the thermally conductive silicone material comprising:

a silicone resin matrix made from the silicone component; and the polyhedral filler dispersed in the silicone resin matrix.

4. The thermally conductive silicone material of claim 3, wherein in a state where the thermally conductive silicone material is pressed with direct pressure under a condition of a press pressure of 1 MPa, thermal resistance of the thermally conductive silicone material in a direction of the press pressure is less than or equal to 0.8 K/W.

5. The thermally conductive silicone material of claim 4, wherein

TABLE 1

|  | Examples | | | Comparative Examples | | | |
| --- | --- | --- | --- | --- | --- | --- | --- |
|  | 1 | 2 | 3 | 1 | 2 | 3 | 4 |
| Silicone Component | TES8553 | TES8553 | TES8553 | TES8553 | TES8553 | TES8553 | — |
| Filler | Polyhedral Filler | Polyhedral Filler | Polyhedral Filler | Spherical Filler | Spherical Filler | Spherical Filler | — |
| Filler Content (volume %) | 75 | 70 | 80 | 75 | 70 | 80 | — |
| Viscosity ((Pa · s) | 2100 | 1000 | 2900 | 2200 | 1100 | 3000 | — |
| Asker C Hardness | 15 | 10 | 20 | 15 | 10 | 20 | >50 |
| Thermal Resistance (K/W) | 0.7 | 0.8 | 0.5 | 0.8 | 0.9 | 0.6 | 0.6 |

The invention claimed is:

1. A thermally conductive silicone composition comprising:

the thermally conductive silicone material has an Asker C hardness of less than or equal to 40.

* * * * *